Patented Aug. 12, 1952

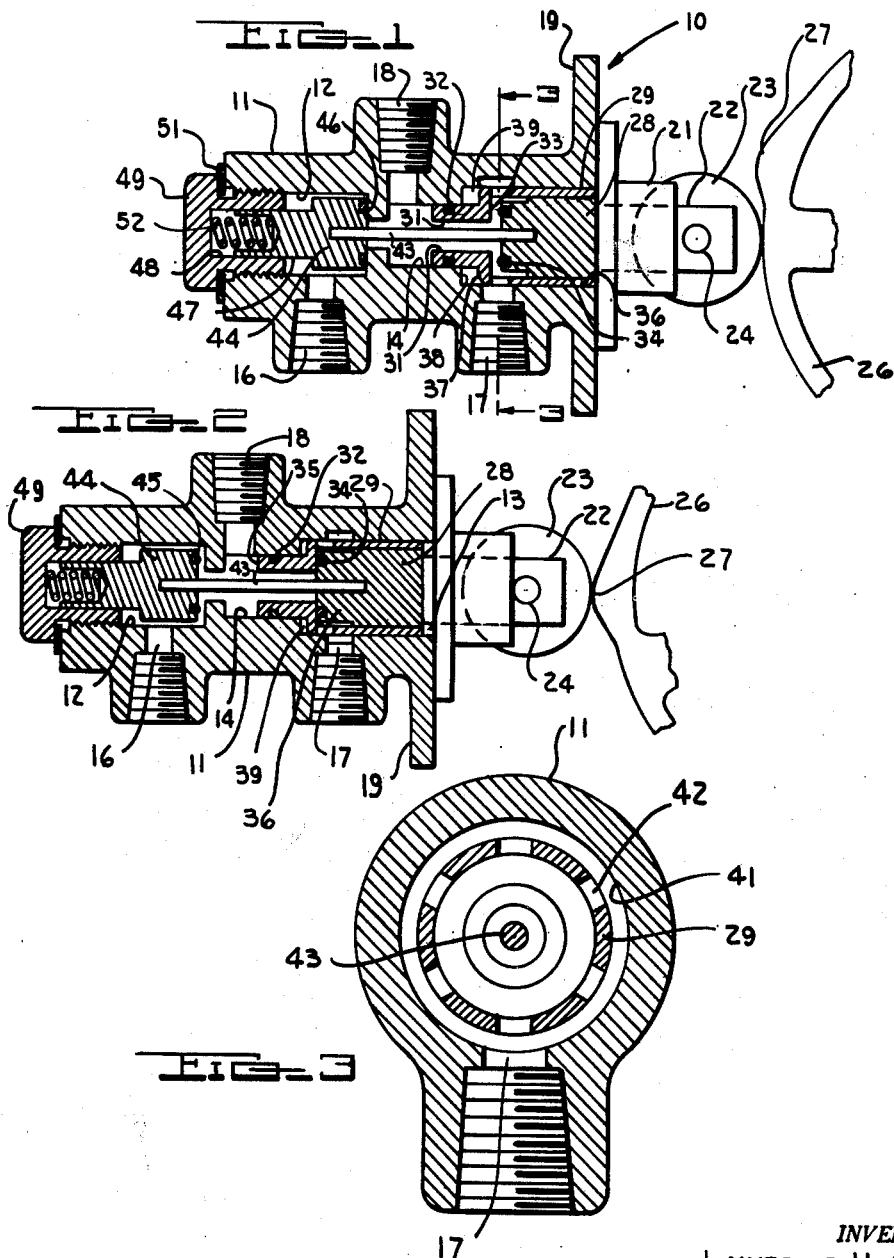

2,606,739

UNITED STATES PATENT OFFICE 2,606,739

FLUID CONTROL VALVE

Lawrence H. Gardner, Lakewood, Ohio

Application April 30, 1948, Serial No. 24,129

6 Claims. (Cl. 251—143)

This invention relates to valves for controlling the flow of fluid to and from devices such as working cylinders which are adapted to apply force for doing work in connection with the operation of various kinds of mechanical and other apparatus.

An object of the invention is to provide a simple and inexpensive valve which can be mechanically or otherwise operated, and which can be set up with the apparatus with which it is to be employed without the necessity for precision measurements which ordinarly are involved in locating such devices with respect to the timing or actuating mechanism employed therewith.

Other and further objects of the invention will be apparent by reference to the accompanying drawings of which there is one sheet, which, by way of illustration, shows a preferred embodiment and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawings:

Fig. 1 is a longitudinal sectional view of a fluid control valve embracing the principles of the invention as such valve is set up to be operated by a cam actuated timing mechanism by which the valve is actuated;

Fig. 2 is a view similar to Fig. 1, except that the mechanism is shown in a different operative position;

Fig. 3 is an enlarged cross sectional view taken through the valve illustrated by Figs. 1 and 2, substantially as the valve structure would appear in the plane of line 3—3 on Fig. 1.

Referring more particularly to the structure illustrated by the drawing, the numeral 10 indicates generally a fluid control valve comprising a casing or body 11 having a transverse passageway or chamber formed therein which consists of cylindrical inlet and exhaust chambers 12 and 13 respectively, which are connected by an intermediate chamber indicated at 14. The three chambers referred to are provided with ports 16, 17, and 18 respectively, which are formed in the body 11 and which are adapted to be connected respectively to a fluid pressure source or pump, not shown, to exhaust, and to a fluid pressure actuated device or working cylinder. These ports may be so connected by suitable conduits or pipes, not shown, which may be secured in the threaded openings with which the ports referred to are provided.

The fluid pressure source or pump and the working cylinder form no part of the present invention and therefore are not illustrated, these devices or types of apparatus being mentioned merely for the purpose of illustrating certain possible uses for the control valve. Notwithstanding such illustration, however, it is apparent that the valve may be employed with any apparatus where it is desirable to control the flow of a working fluid from one device to another.

The port 17 also may be connected to the atmosphere or other suitable exhaust by a conduit or pipe connected to the threaded opening forming a part of the port, or the port may be allowed to discharge directly to the atmosphere or other suitable exhaust.

One end of the body 11 is provided with a suitable securing flange 19 by which the valve may be secured to the apparatus with which it may be employed. At the end of the body 11 and at one side of the flange 19 is a flanged collar indicated at 21 in which is slidably disposed an actuating member 22. The collar 21 is secured to the flange 19 in such position that the actuating member 22 will be concentrically disposed relative to the cylindrical exhaust chamber 13.

The outer end of the collar 21 and the actuating member 22 are provided with slots formed longitudinally therein in which a roller or cam follower 23 is rotatably mounted within the actuating member 22 upon a pin 24. The periphery of the follower or roller 23 is adapted to roll upon the surface of an actuating or timing device 26.

The surface of the timing device 26 against which the follower 23 is adapted to be continuously operated is provided with one or more cams or projections 27 which are adapted to move the follower 23 with respect to the body 11.

The end of the actuating member 22 inwardly of the flange collar 21 is an integral part of a valve piston 28 which is adapted to be reciprocably mounted in the cylindrical interior surface of a sleeve member 29. The sleeve member 29 in turn is reciprocably mounted in the interior cylindrical surface of the exhaust chamber 13. The end of the sleeve 29 adjacent the intermediate chamber 14 is reduced in such manner as to provide a cylindrical guide 31 which is adapted to be slidably and reciprocably mounted in the cylindrical end of the chamber 14 which is adjacent to and in open communication with the exhaust chamber 13.

The guide 31 is provided with a sealing ring 32 of rubber or other suitable material around the periphery thereof for forming a relatively fluid-tight fit, with the engaging surface of the body 11 surrounding the intermediate chamber 14. The annular shoulder 35 at the end of the guide 31 provides a surface affected by the fluid pressure within the intermediate chamber 14, thereby tending to move the sleeve 29 away from the intermediate chamber 14.

The reduced end or guide 31 which is formed as an extension of the sleeve 29 provides internally of the sleeve 29 an annular valve seat 33 which is adapted to be engaged by the adjacent end of the valve piston 28 when the piston is moved by the roller 23. The adjacent end of the piston 28 referred to is provided with a suitable rubber ring or gasket 34 which is adapted to engage the seat 33 to provide an exhaust valve 36 which prevents the flow of fluid between the intermediate chamber 14 and the exhaust chamber 13 when the valve engages the seat 33.

The guide 31 also provides an annular shoulder indicated at 37 which is formed on the exterior surface of the sleeve 29, and which is disposed oppositely with respect to a shoulder 38 formed by the annular surface of the body 11 which connects the intermediate chamber 14 and the exhaust chamber 13.

The space between the shoulders 37 and 38 and the sleeve 29 and the body 11 respectively, provides an annular chamber indicated at 39 which is formed exteriorly of the sleeve 29 and between the intermediate and exhaust chambers 14 and 13 respectively.

The exhaust port 17 is provided with an annular extension indicated at 41 which is formed in the body 11 around the exterior surface of the sleeve 29 at the end thereof adjacent the chamber 39. Immediately adjacent the seat 33, the sleeve 29 is provided with a plurality of radially disposed openings 42 adapted to provide communication between the interior of the sleeve 29 and the exhaust port 17. Such communication is provided through the exhaust port extension 41.

The valve 36 which forms a part of the valve piston 28 is connected by a rod 43 to an inlet valve 44 which is located within the inlet chamber 12. The rod 43 is secured in any suitable manner at the opposite ends thereof within the valves 36 and 44 and extends between the two concentrically with respect to the guide 31 and the intermediate chamber 14. Between the inlet chamber 12 and the intermediate chamber 14, there is provided an annular seat 46 with which a rubber ring 45 secured in the adjacent end of the valve 44 is adapted to engage for the purpose of preventing the flow of fluid between the inlet chamber 12 and the intermediate chamber 14 when the valve 44 engages the seat 46.

The opposite end of the inlet valve 44 is provided with a cylindrical projection or extension indicated at 47 which is adapted to be slidably disposed within a cylindrical opening 48 formed in a cap 49 which is threaded within the end of the inlet chamber 12 and forms a part of the body 11.

Between the cap 49 and the body 11 there is disposed an annular gasket 51 adapted to prevent leakage of fluid from the inlet chamber 12. A spring 52 is mounted in the cylindrical opening 48 between the end of the cap 49 and a recessed end of the extension 47 of the inlet valve 44. The spring 52 tends to urge the inlet valve 44 against its seat 46.

The inlet valve 44 being connected to the exhaust valve 36 by the rod 43, it will be apparent that the spring 52 also tends to hold the valve 36 in open relation to its seat 33. The length of the valve 36 including the valve piston 28 is such that when the exhaust valve 36 is in open position with respect to its seat 33, the opposite end of the piston 28 and the sleeve 29 will engage the flange portion of the flanged collar 21. Also, when the valve piston 28 and the sleeve 29 is in engagement with the collar 21, the shoulder 37 is in such position with respect to the extension 41 of the exhaust port 17 that the chamber 39 is in open communication with the exhaust port 17. This is due to the fact that in such position the shoulder 37 moves slightly beyond the adjacent edge of the extension 41 of the exhaust port 17.

With the valve piston 28 and the sleeve 29 in such position, it will be apparent that the port 18 will be in open communication with the port 17 through the intermediate chamber 14, the interior of the sleeve 29, the openings 42 and the exhaust port extension 41. Due to the fact that the chamber 39 is in open communication with the exhaust port 17 when the valve piston 28 and the sleeve 29 are in the position referred to, it will be apparent that the fluid pressure in the chamber 39 will be approximately the same as the fluid pressure in the annular extension 41 of the exhaust port 17.

However, upon movement of the actuating device 26, the cam 27 will engage the follower 23 and the throw of the cam 27 is such that the valve piston 28 will be moved until the valve 36 engages the seat 33. Such engagement of the valve 36 and the seat 33 will close the previously established communication between the working port 18 and the exhaust port 17 through the intermediate chamber 14 and the openings 42. In order to establish a proper fluid-tight sealing relation between the valve 36 and its seat 33, the throw of the cam 27 also is designed in such manner that the valve 36 will move the sleeve 29, when the valve 36 engages the seat 33, a sufficient amount to completely cut off the communication previously referred to as being established between the chamber 39 and the extension 41 of the exhaust port 17.

So long as the throw of the cam 27 is great enough to cut off the communication between the chamber 39 and the exhaust port 17 referred to, it does not matter particularly how much farther than necessary the valve 36 may move the sleeve 29 against the fluid pressure affecting the annular shoulder 37. The chamber 39 therefore provides a compression or pneumatic chamber resisting the movement of the sleeve 29 in one direction. The only possible result of any such excess movement will be that fluid which may be trapped in the chamber 39 will be compressed to some extent so that it may escape into the exhaust port 17 through a suitable clearance (not shown) which may be provided between the sleeve 29 and the cylindrical wall of chamber 39. Therefore, it is desirable for installation purposes to design the cam 27 in such manner that the valve 36 will move the sleeve 29 a considerable distance after the engagement of the valve 36 with its seat 33. An example of such considerable distance is illustrated in Fig.

2. It is apparent that the chamber 39 has been reduced by about one-half its length after the exhaust port 17 has been cut off upon the engagement of the valve 36 with the seat 33.

Due to the fact that the inlet valve 44 is connected to the exhaust valve 36 by the rod 43, it will be apparent that the inlet valve 44 will commence its opening movement as soon as the valve 36 commences to move toward its seat 33. When the valve 36 is completely seated upon its seat 33 the valve 44 will be in open position with respect to its seat 46 thereby establishing open communication between the inlet port 16 and the working port 18. Such closing movements of the valve 36 and opening movement of the valve 44 will be opposed by the spring 52.

However, when the roller or follower 23 has moved beyond the cam 27 the spring 52 will again close the inlet valve 44 and open the exhaust valve 36 thereby closing communication between the inlet port 16 and the working port 18 and re-establishing communication between the working port 18 and the exhaust port 17. At the same time the fluid affecting the annular shoulder 35 will move the sleeve 29 until communication is re-established between the chamber 39 and the exhaust port 17.

While I have illustrated and described a preferred embodiment of my invention, it is understood that this is capable of modification, and I therefore do not wish to be limited to the precise details set forth, but desire to avail myself of such changes and alterations as fall within the purview of the following claims.

I claim:

1. A fluid pressure control valve comprising a valve body having fluid inlet and exhaust chambers and an intermediate chamber connecting said inlet and exhaust chambers formed interiorly thereof, said chambers having ports adapted for connecting said chambers respectively to a fluid pressure source, to atmosphere, and to a fluid pressure actuated device, a cylindrical sleeve disposed in said exhaust chamber, said sleeve being slidably disposed for movement in said exhaust chamber transversely with respect to said exhaust port, said sleeve being provided with an opening formed therein for providing communication between the interior of said sleeve and said exhaust port, said sleeve being formed to provide an annular seat between said opening and said intermediate chamber, an exhaust valve disposed within said sleeve for engagement with said seat, said exhaust valve being formed to provide a cylindrical piston, said piston being slidably mounted within said sleeve for transverse movement therein with respect to said opening, said valve body having a shoulder cooperable with an oppositely disposed shoulder on said sleeve to form a compression chamber for resiliently opposing the movement of said sleeve by said exhaust valve in response to the engagement of said seat by said exhaust valve, means for moving said exhaust valve into engagement with said seat and for further moving said sleeve by said exhaust valve against said compression chamber for resiliently opposing the movement of said exhaust valve and said sleeve beyond said position of engagement between said exhaust valve and seat, and an inlet valve disposed within said inlet chamber for controlling the flow of fluid between said inlet chamber and said intermediate chamber, and means rigidly connecting said inlet valve and said exhaust valve for operating either of said valves in response to the movement of the other of said valves.

2. A fluid pressure control valve comprising a valve body having fluid inlet and exhaust chambers and an intermediate chamber connecting said inlet and exhaust chambers formed interiorly thereof, said chambers having ports adapted for connecting said chambers respectively to a fluid pressure source, to atmosphere, and to a fluid pressure actuated device, a sleeve disposed in said intermediate and exhaust chambers, said sleeve being slidably disposed for movement in said exhaust chamber transversely with respect to said exhaust port, said sleeve being provided with an opening formed therein for providing communication between the interior of said sleeve and said exhaust port, said sleeve being formed to provide a seat interiorly of said sleeve between said opening and said intermediate chamber, an exhaust valve disposed within said sleeve for engagement with said seat, said exhaust valve being formed to provide a piston slidably mounted within said sleeve for transverse movement therein with respect to said opening, said sleeve and said valve body also being formed to provide a compression chamber during engagement of said seat by said exhaust valve for resiliently opposing the movement of said sleeve by said exhaust valve in response to the engagement of said seat by said exhaust valve, means for moving said exhaust valve into engagement with said seat and for further moving said sleeve by said exhaust valve within said compression chamber for resiliently opposing the movement of said exhaust valve and said sleeve, and an inlet valve disposed within said inlet chamber for controlling the flow of fluid between said inlet chamber and said intermediate chamber.

3. A fluid pressure control valve comprising a valve body having a pair of chambers and an intermediate chamber connecting said pair of chambers formed interiorly thereof, said chambers having ports adapted for connecting said chambers to a fluid pressure source and a fluid pressure actuated device and to atmosphere, a member associated with one of said pair of chambers, said member being movable transversely with respect to the port associated with said one chamber, said member being provided with an opening therein for providing communication between said intermediate chamber and said one port, said member being formed to provide a seat between said opening and said intermediate chamber, a valve piston associated with said member for engagement with said seat, said valve piston being mounted for transverse movement with respect to said opening, said member also being formed to provide a shoulder disposed oppositely relative to said seat and cooperable with said valve body to form a compression chamber therebetween for resiliently opposing the movement of said member by said valve piston in response to the engagement of said seat by said valve piston, means for moving said valve piston into engagement with said seat and for further moving said member in response to said movement of said valve piston, said compression chamber resiliently opposing the movement of said valve piston and said member beyond the position of engagement between said valve piston and seat.

4. A fluid pressure control valve comprising a valve body having a pair of chambers formed interiorly thereof, said valve body having ports adapted for connecting said valve body in a fluid pressure source, and a fluid pressure device, a valve member associated with one of said chambers for controlling the flow of fluid through said one chamber between the other of said chambers and the port associated with said one chamber, said valve member having a seat member movably supported by said body, said seat member being movable by said valve member upon the closing by said valve member of said communication between said one port and said other chamber, said body and seat member being formed to provide piston and cylinder means resiliently opposing said movement of said seat member by said valve member, and means for moving said valve member into engagement with said seat member and for further moving said seat member by said valve member against said resilient piston and cylinder means.

5. A fluid pressure control valve comprising a valve body having a chamber formed interiorly thereof, said valve body having ports adapted for operatively connecting said valve body in a fluid pressure system, a cylindrical sleeve disposed in said chamber, said sleeve being slidably disposed for movement in said chamber transversely with respect to one of said ports, said sleeve being provided with a plurality of radially disposed openings formed therein for providing communication between the interior of said sleeve and said one port, said body being formed to provide an annular extension of said one port about said sleeve in opposite relation to said openings, said sleeve being formed to provide an annular seat between said openings and the other of said ports, a valve member disposed within said sleeve for engagement with said seat, said valve member being formed to provide a cylindrical piston, said piston being slidably mounted within said sleeve for transverse movement therein with respect to said openings, said sleeve and said body also being formed to provide oppositely disposed annular shoulders for movement relative to one another in response to the movement of said sleeve, and means for moving said valve member into engagement with said seat and for further moving said sleeve by said valve member, said sleeve and body providing pneumatic means for resiliently opposing the movement of said valve member and said sleeve beyond said position of engagement between said valve member and seat, said valve member moving means comprising a cam and follower mechanism associated with said body with the follower of said mechanism being operatively associated with said valve member.

6. A fluid pressure control valve comprising a valve body having a chamber formed interiorly thereof, said chamber having ports adapted for connecting said chamber to a fluid pressure device, a cylindrical sleeve disposed in said chamber, said sleeve being slidably disposed for movement in said chamber transversely with respect to one of said ports, said sleeve being provided with an opening formed therein for providing communication between the interior of said sleeve and said one port, said sleeve being formed to provide an annular seat interiorly of said sleeve between said opening and the other of said ports, a valve member disposed within said sleeve for engagement with said seat, said valve member being slidably mounted within said sleeve for transverse movement therein with respect to said opening, said sleeve and said body also being formed to provide pneumatic means, said pneumatic means providing a compression chamber for resiliently opposing the movement of said sleeve by said valve member in response to the engagement of said seat by said valve member, and means for moving said valve member into engagement with said seat and for further moving said sleeve by said valve member against said pneumatic means, said last means comprising a cam and follower mechanism associated with said body with the follower of said mechanism being operatively associated with said valve member.

LAWRENCE H. GARDNER.

REFERENCES CITED

The following references are of record in the file of this patent:

UNITED STATES PATENTS

| Number | Name | Date |
|---|---|---|
| 1,350,438 | Davidson | Aug. 24, 1920 |
| 1,530,691 | Parsons | Mar. 24, 1925 |
| 1,588,657 | Christiansen | June 15, 1926 |
| 1,746,738 | Pickering | Feb. 11, 1930 |
| 1,791,901 | McIntyre | Feb. 10, 1931 |
| 1,888,948 | Hazard | Nov. 22, 1932 |
| 2,030,458 | McKellar | Feb. 11, 1936 |
| 2,235,858 | Williams | Mar. 25, 1941 |
| 2,379,181 | Pontius | June 26, 1945 |
| 2,385,733 | Schroer | Sept. 25, 1945 |

FOREIGN PATENTS

| Number | Country | Date |
|---|---|---|
| 21,048 | Great Britain | of 1891 |